No. 853,608. PATENTED MAY 14, 1907.
J. B. TALBOT.
APPARATUS FOR MOLDING CEMENT BLOCKS.
APPLICATION FILED APR. 6, 1906.
2 SHEETS—SHEET 1.
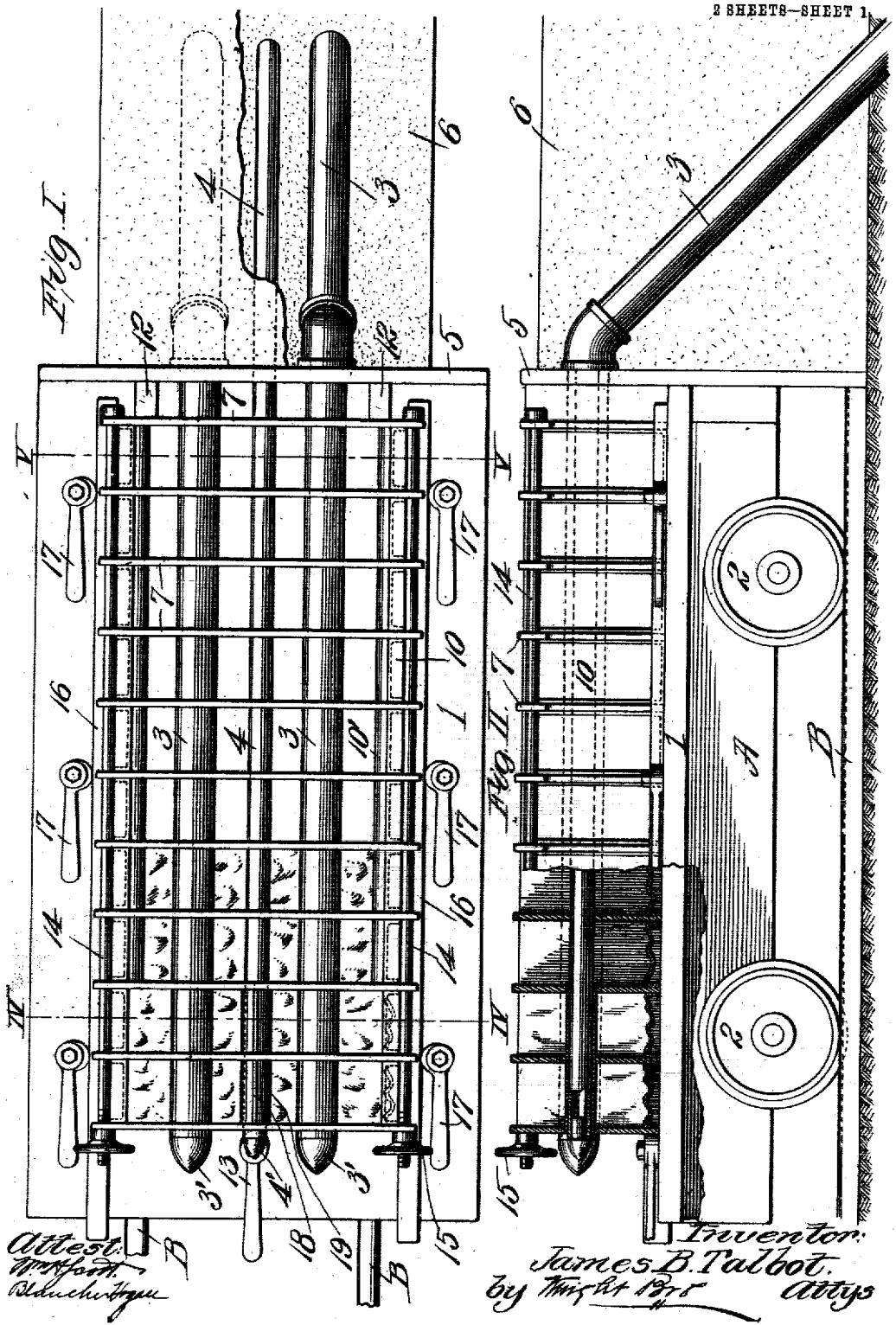
Inventor
James B. Talbot.
by Wright Bros.
Attys No. 853,608. PATENTED MAY 14, 1907.
J. B. TALBOT.
APPARATUS FOR MOLDING CEMENT BLOCKS.
APPLICATION FILED APR. 6, 1906.
2 SHEETS—SHEET 2.
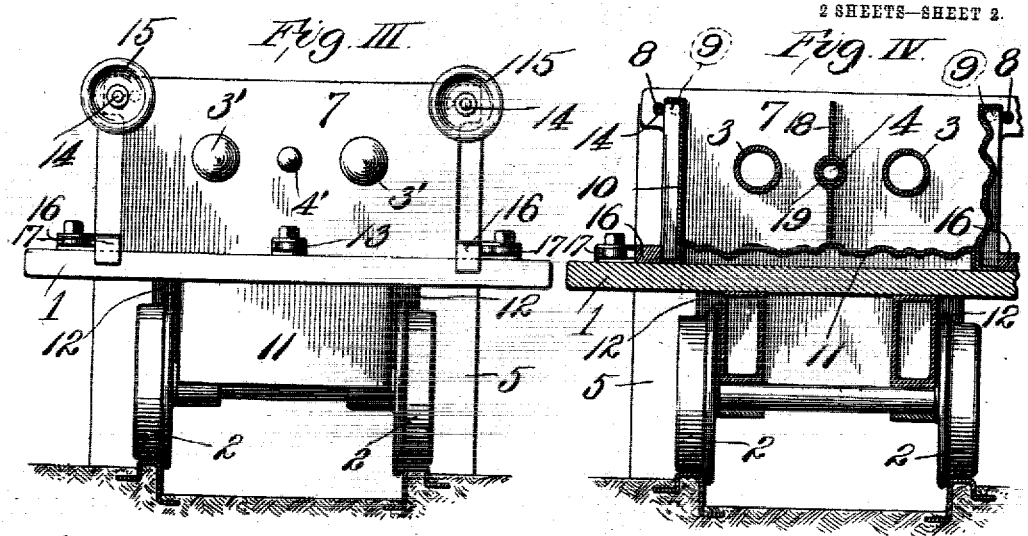
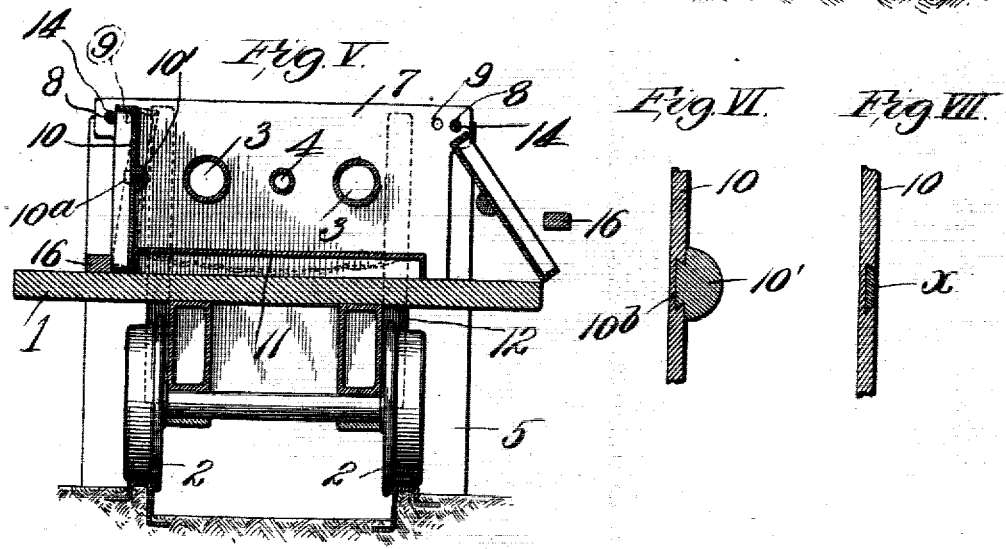
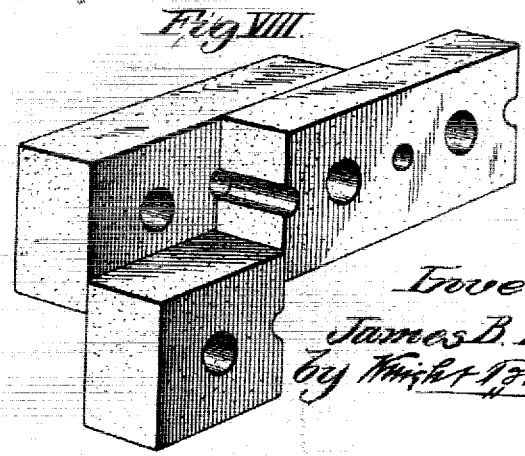

UNITED STATES PATENT OFFICE.

JAMES B. TALBOT, OF EDWARDSVILLE, ILLINOIS.

APPARATUS FOR MOLDING CEMENT BLOCKS.

No. 853,608.

Specification of Letters Patent.

Patented May 14, 1907.

Application filed April 6, 1906. Serial No. 310,251.

*To all whom it may concern:*

Be it known that I, JAMES B. TALBOT, a citizen of the United States, residing in Edwardsville, in the county of Madison and State of Illinois, have invented certain new and useful Improvements in Apparatus for Molding Cement Blocks, of which the following is a full, clear, and exact description, reference being had to the accompanying drawings, forming part of this specification.

My invention relates to that type of cement block molding apparatuses shown and described in United States Letters Patent granted to Thos. Fischer and myself November 11, 1905, No. 804,528.

The objects of my present improvement are to so construct a cement block molding apparatus that various shapes of blocks may be laid therein; also that different sizes of blocks may be made in the apparatus; and also a construction whereby the separable mold members may be readily and quickly clamped in molding position and released after the molding operation has been completed.

Figure I is a top or plan view of my apparatus. Fig. II is a view partly in side elevation and partly in vertical longitudinal section. Fig. III is a front end elevation of the apparatus. Fig. IV is a vertical cross section taken on line IV—IV, Fig. I. Fig. V is a vertical cross section taken on line V—V, Fig. I. Fig. VI is an enlarged vertical section taken through the central portion of one of the side wall mold compartment sections and showing a detachable bead strip applied thereto through the medium of which the grooves in the ends of the mold blocks may be produced. Fig. VII is a similar view to Fig. VI, the bead strip being omitted and its receiving pocket being shown closed by a filler strip. Fig. VIII is a perspective view of a series of blocks of the form produced in my apparatus shown assembled in the positions they occupy when laid in a mold.

A designates a carriage that is provided with a platform 1 and is supported by track wheels 2 which are adapted to ride upon track rails B. The carriage A is adapted to carry the molding members to be hereinafter described.

3 designates a pair of outer core rods superimposed above the track consisting of the rails B, and 4 is an intermediate core rod positioned between said outer rods. The rear ends of the rods 3 and 4 extend through an upright member 5 and are inclined downwardly at the rear of said member and embedded within a body 6 of concrete, whereby the rods are rigidly held from movement. The forward free ends of the core rods 3 are provided with tapering heads 3' and the forward free end of the intermediate core rod is provided with a tapering head 4'. These heads are shaped as mentioned in order that the transverse mold members to be hereinafter mentioned will more readily ride onto said rods.

7 designates a series of transverse mold boards that are provided with apertures corresponding in number to the outer and intermediate core rods, and adapted to be threaded onto said core rods, the apertures in said mold board being of dimensions corresponding approximately to the dimensions of the core rods onto which they are fitted. Each of the transverse mold boards is provided near its outer edges and near the top with outer rod-receiving holes 8 and inner rod-receiving holes 9.

10 designates side mold compartment sections that separate the transverse mold boards by being positioned between the alternating pairs thereof and which determine the width of the cement blocks that are to be molded in the apparatus. These mold sections 10 are preferably of trough like shape having flanges at their outer sides. The inside faces of the sections may be in the form of plane surfaces in order that a flat molding face may be produced upon the cement block at the portion which is molded in contact with any particular section or the sections may have configurations at their inner faces whereby the molded blocks may be produced with faces simulating rough stone.

11 designates the bottom mold members which are positioned between pairs of the transverse mold board 7 and pairs of the side mold sections 10. Each of these bottom members is preferably formed with flanges that rest upon the carriage platform 1 that supports the members 7 and 10, and the bottom members may be formed in a manner similar to that described with respect to the side sections, in order that the blocks produced may be formed with either plane faces or irregular faces. The rearmost transverse mold board 7 is adapted to rest against upright strips 12 located in front of the upright member 5 of the apparatus whereby said mold board is maintained in vertical position while the foremost transverse mold board is held at its lower edge by a clamp lever 13 that when moved into clamping position serves to cause a binding action upon the foremost mold board that is transmitted therefrom through the various transverse mold boards and side mold sections toward the rearmost mold board to maintain all of said members in a closely assembled condition.

14 designates binding rods that are adapted to be passed through either the outer series of rod-receiving holes 8 in the transverse mold boards or the inner series 9 of rod-receiving holes according to the positions in which it may be desired to hold the side mold section 10. Each binding rod is provided at one end with a head and is threaded at its other end to receive a clamp nut 15. It will be seen that when the binding rods are passed through either series of the bolt holes in the transverse mold boards and the clamp nuts are tightened on said rods, the transverse mold boards and the side mold sections located between them are bound tightly together at their upper portions. The binding rods 14 are adapted to be passed through the outer rod-receiving holes 8 when the side mold sections 10 are to be maintained in upright positions to produce end faces on the blocks at right angles to the tops of the blocks considered with reference to their position in the apparatus, and the rods are adapted to be passed through the inner holes 9 when it is desired to hold the upper ends of the side mold sections inwardly to produce blocks having tapering end faces.

16 designates binding strips that are loosely seated on the carriage platform 1 and are adapted to bear against the lower ends of the side mold sections 10, as seen most clearly in Figs. III to V inclusive. These binding strips extend longitudinally of the carriage platform and are of lengths corresponding to or exceeding the combined series of mold members, whereby each binding strip serves to hold the lower ends of the entire set of side mold sections at the side of the multiple mold at which it is located. The binding strips 14 are adapted to be held for binding action against the side mold sections by clamp levers 17 mounted upon the carriage platform 1.

10′ designates bead strips upon the inner faces of the side mold sections that are adapted by their presence thereon to cause production of grooves in the ends of the cement blocks similar to those shown and described in the Letters Patent hereinbefore mentioned, and of which no further description is deemed necessary. These bead strips may be rigidly secured to or formed integral with the side mold sections, but they are at least in part made detachable from said sections in order that where desirable, as in the instance of producing blocks having end faces that are to be exposed at the exterior of a wall, said strips may be removed. The bead strips may be detachably fitted to the side mold sections by any suitable means, such as screws $10^a$ (see Fig. V), or the strips may be provided with dove-tail tenons $10^b$ to seat in correspondingly shaped pockets formed in the side mold sections 10, as seen in Fig. VI. Where the latter form of construction is made use of the pocket that receives the tenon of each strip may be closed by a filler strip $x$, as seen in Fig. VII, for the purpose of rendering the mold face of the mold section flush.

For the purpose of providing for the production of cement blocks of smaller sizes than those produced in the main portion of the machine in which the mold compartments extend entirely across the multiple mold, I subdivide the mold compartments by introducing into any desired number of them partitions 18 that are provided with sleeves 19 fitted to the intermediate core rod 4 and extending longitudinally thereon. It will be seen that these partitions afford proper molding faces for blocks to be molded at each side thereof, and that the sleeves have the same utility as the intermediate core rod in that they produce matching grooves in the molded blocks.

I claim:

1. In a cement block molding apparatus, the combination of a platform, apertured mold boards seated on said platform, side mold sections loosely interposed between pairs of said mold boards, means for retaining said mold boards in vertical positions with said side mold sections between them, and core rods independent of said platform and onto which said mold boards are threaded, substantially as set forth.

2. In a cement block molding apparatus, the combination of a platform, mold boards seated on said platform, side mold sections loosely interposed between pairs of said mold boards, means for retaining said mold boards in vertical position with said side mold sections between them, and removable bottom mold members inclosed between pairs of said mold boards and pairs of said side mold sections, substantially as set forth.

3. In a cement block molding apparatus, the combination of a platform, mold boards seated on said platform, a plurality of side mold sections loosely interposed between pairs of said mold boards at each side of the apparatus, and means for retaining said mold boards in vertical positions with said side mold sections between them; said side mold sections being provided with detachable bead strips, substantially as set forth.

4. In a cement block molding apparatus, the combination of a platform, mold boards supported by said platform, side mold sections interposed between said mold boards, a core rod to which said mold boards are fitted, and partitions fitted to said core rod and arranged in the compartments provided between said mold boards and said side mold sections, substantially as set forth.

5. In a cement block molding apparatus, the combination of a platform, mold boards supported by said platform, side mold sections interposed between said mold boards, a core rod to which said mold boards are fitted, and partitions fitted to said core rod and arranged in the compartments provided between said mold boards and said side mold sections; said partitions being provided with sleeves fitted to said core rod, substantially as set forth.

6. In a cement block molding apparatus, the combination of a platform, mold members seated on said platform and a portion of which are apertured, and core rods onto which said apertured mold members are threaded; said core rods having tapering heads at free ends thereof, substantially as set forth.

JAMES B. TALBOT.

In presence of
J. F. BENTLEY,
CHARLES E. GUELTIG,
JOHN F. SCHULZ.